Sept. 8, 1953     H. A. PRICE ET AL     2,651,518
TARE WEIGHT SCALE
Filed March 19, 1951     2 Sheets-Sheet 1
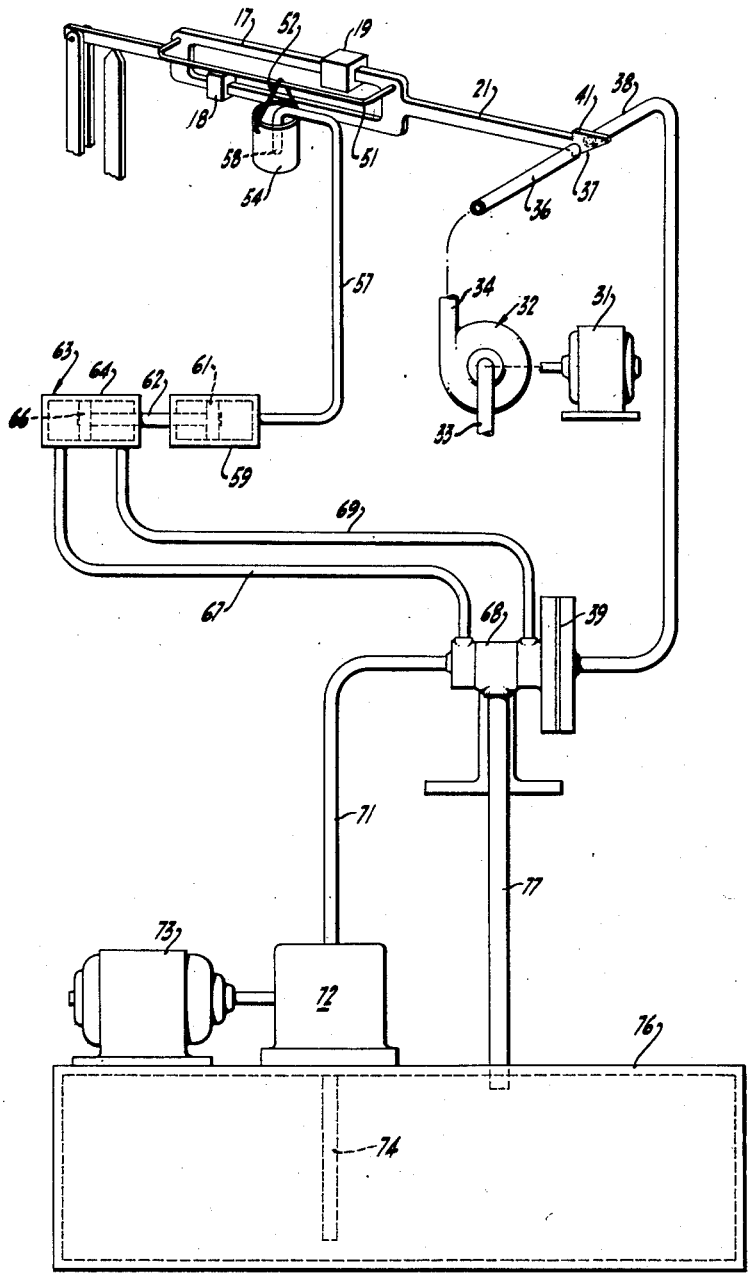
FIG_1
Inventors
HAROLD A. PRICE
EDGAR HERBERT VICKERY
Attorney

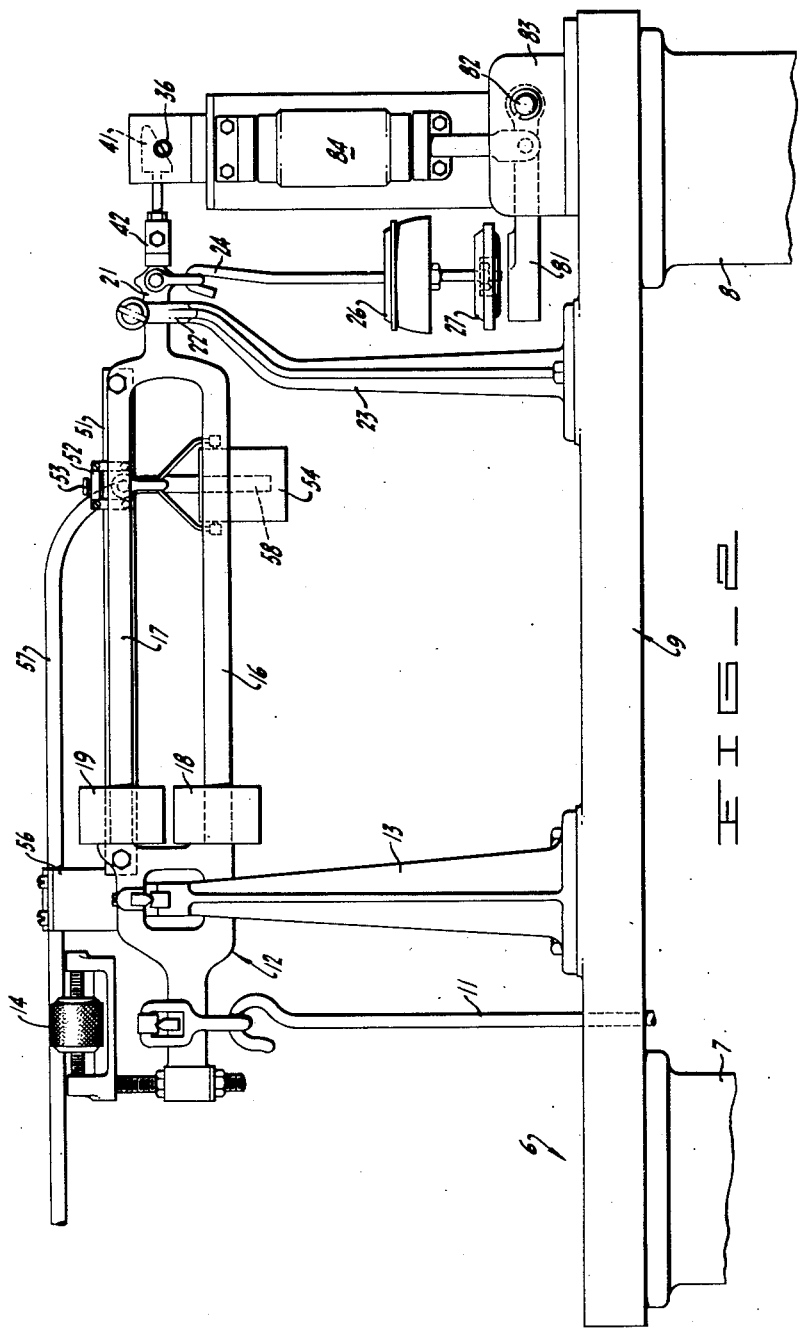

Patented Sept. 8, 1953

2,651,518

UNITED STATES PATENT OFFICE 2,651,518

TARE WEIGHT SCALE

Harold A. Price, San Francisco, and Edgar Herbert Vickery, Oakland, Calif., assignors to The Rucker Company, a corporation Application March 19, 1951, Serial No. 216,309

8 Claims. (Cl. 265—27)

Our invention relates to weighing devices and is especially concerned with weighing devices utilized commercially in filling containers with a specified or set weight of a commodity. The containers are sometimes stationary; for example, a single batch plant hopper, as used repeatedly in concrete mixing plants, which varies in weight in successive uses due to adhering material, and are sometimes portable; for example, a number of similar metal drums as used in oil distributing plants. To represent these and other commercial environments, portable oil drums are referred to herein.

The containers are usually fairly uniform in size and general configuration but vary somewhat in individual weight. It is therefore customary in the usual process of filling to take a container either new or used and place it upon the scale platform and manually establish the weight of the container. Then, when the product or commodity is weighed into the container, it is necessary to subtract the previously indicated container weight from the total container and content weight indicated by the scale. This not only involves a mental operation subject to error but requires considerable time since it is desirable to weigh the empty container quite accurately.

It is therefore an object of our invention to provide a tare weight scale which will automatically set the mechanism in accordance with the weight of the container before the container is filled.

Another object of our invention is to provide a tare weight scale which will facilitate and accelerate the operation of filling containers with a weighed amount of commodity.

Another object of our invention is to provide a tare weight scale which incorporates a large number of relatively standard units so that the customary kind of scale can readily be adapted to tare weighing and can as easily be changed back to normal weighing, if desired.

A still further object of the invention is to provide a tare weight scale having a high degree of accuracy, no less than the degree of accuracy normally possessed by similar scales generally.

A still further object of the invention is to provide a tare weight scale of improved characteristics and having a wide range of operation in an automatic or semi-automatic fashion.

An additional object of our invention is in general to improve tare weight scales.

Other objects, together with the foregoing, are attained in the embodiment of the invention described in the accompanying description and illustrated in the accompanying drawings, in which Figure 1 is a diagrammatic representation of a tare weight scale organization in accordance with our invention, certain conventional parts of the structure being eliminated for clarity.

Figure 2 is an elevation of parts of a standard beam scale having applied thereto additional structures, illustrated in part in Figure 1, which convert the standard scale into a tare weighing scale pursuant to our invention.

While the tare weight scale of our invention is susceptible to numerous variations depending particularly upon the weighing process to be utilized in any individual case and is likewise variable to accommodate numerous different weighing situations, it has quite successfully been incorporated in the arrangement illustrated herein particularly for use in first tare weighing steel drums or containers for oil such as fuel or lubricating oil, and for weighing such drums as they are being filled so that they finally contain a predetermined or established net weight of product.

In the form of the invention chosen for illustration herein, there is utilized a standard scale 6 having a pair of uprights 7 and 8 included in the frame 9. The scale includes a scale platform (not shown) of the customary type on which the containers are disposed in empty condition and in filling or filled condition for weighing. The position of the scale platform in response to the weight of the material resting upon it is communicated by a rod 11 to a balance beam 12 of the standard kind mounted on a supporting pedestal 13 projecting upwardly from the frame 9.

The balance beam 12 is for the most part entirely standard, being provided with the customary fine adjusting and calibrating weight 14 and having the usual graduated arms 16 and 17 with the normal adjustable balance weights 18 and 19 slidable thereon. The balance beam 12, at a point remote from the fulcrum and in the standard fashion, has a projection 21 extending through a locking frame 22 of the usual kind on a pedestal 23 upstanding from the frame 9. A weight hook 24 depends from the projection 21 and adjacent its lower end receives a fixed balance weight 26 and extends even farther to receive slidably an auxiliary balance weight 27.

As so far described, the scale structure is entirely standard. It can be utilized in the regular way, when a weight is on its platform for weighing, by suitable manipulation of the sliding weights 18 and 19 and by the addition, if necessary, of weight such as 26 and 27 to the hook support 24. The extension 21, when in a neutral or approximately horizontal position within the frame work 22 indicates equilibrium between the material being weighed and the adjustment of the balance beam 12, the pointer or extension 21 swinging above and below such neutral position to indicate deficient or excessive adjustment of the scale beam weights.

Pursuant to our invention, we preferably utilize the motion of the scale beam 12 to actuate a responsive device but do so in such a way that there is no or substantially no load on or impediment to the free motion of the scale beam 12. We consider it highly important that the motion of the scale beam be restricted no more than it normally is so that the calibration of the scale as a whole will not be affected by utilization of our structure. While the motion of the scale beam 12 can be detected or sensed in a number of different ways, we preferably utilize an air jet for that purpose.

As shown particularly in Figure 1, at a convenient point there is provided a source of power 31 such as an electric motor, which drives an air blower 32 or other source of air under pressure. The blower 32 takes air from the atmosphere, for example, through an inlet 33 and discharges it at a higher pressure through an outlet duct 34 which leads to a jet nozzle 36 conventionally illustrated. In actual practice, the diameter of the nozzle 36 at its discharge end is relatively small since the area or cross section of the stream or jet issuing from the nozzle 36 is in part controlling of the accuracy of the mechanism.

In line with the jet 36 or approximately so but spaced from the terminus of the jet to leave a gap 37, is a receiving tube 38 which leads to a pressure responsive diaphragm mechanism 39. Since the blower 32 is normally operated at a substantially constant speed or to produce substantially a constant output and since some of the material leaving the jet 36 is entrained in the receiving tube 38 without substantial dissipation, or, at least, with a constant dissipation, the diaphragm mechanism 39 normally is subject to a substantially constant force when the motor 31 is operating.

In order to vary such force in proportion to the position of the balance beam 12, we add to the extension 21 an intercepting blade 41. This is preferably a very light, planar metal sheet secured by a clamp 42 to the end of the extension 21. The addition of the clamp 42 and the blade 41 changes the weight characteristics of the balance beam 12 and requires a compensating adjustment of the balance weight 14. When this is accomplished, the scale beam 12 has exactly the same characteristics, for all practical purposes, as it previously had.

The contour of the blade 41 is preferably approximately trapezoidal, as especially shown in Figure 2. Its configuration is such that in approximately the mid or horizontal position of the scale beam 12, the blade 41 intercepts approximately half of the air jet issuing from the nozzle 36 and thereby prevents about half of the air jet from entering the tube 38. Since much of the jet is diverted and cannot enter the tube, the air pressure within the tube 38 effective upon the diaphragm 39 is substantially reduced. As the scale beam 12 rises and falls in response to weight adjustment or weight variation, the blade 41 correspondingly rises and falls and lets more or less of the standard jet enter into the receiving tube 38. A correspondingly higher or lower pressure is thereby produced upon the diaphragm mechanism 39. Therefore, the diaphragm mechanism is immediately and directly responsive to the operation of the scale beam 12 in response to the particular uncounterbalanced weight imposed upon it. The operation of the jet, being substantially at right angles to the plane of the blade 41, produces little or no reaction upon the scale beam 12. The operation of the jet in sensing the position of the scale beam does not deleteriously affect the accuracy of the scale beam. The jet, blade 41 and the diaphragm mechanism with their attendant connections and structures can be considered as a sensing means or a means for sensing the position of the scale beam. Furthermore, when the jet is not operating, the scale beam 12 can be utilized in the ordinary manner without change of accuracy and without difficulty.

We provide a structure subject to special regulation corresponding to the weight of containers placed on the scale platform and automatically compensating for the weight of such empty containers. To that end, we mount on the scale beam 12 a supporting rack 51 extending for substantially the length of the scale beam and carrying an adjustable slider 52 secured in any adjusted position by a clamp screw 53. Freely depending from the slider is a bucket 54 adapted to contain a liquid. Since the provision of the rack 51, the supporting structure 52 and the bucket 54 adds considerable weight to the normal scale beam 12, a still further adjustment of the compensating weight 14 is made to bring the scale beam back to its normal equilibrium position after these structures have been initially installed. A similar adjustment is also made each time the support 52 is moved to a new position along the scale beam 12. In the usual commercial operation, a series of almost identical containers is weighed on the scale and one setting of the support 52 is sufficient for a protracted period. If there is a major change in the weight of the containers to be weighed, the position of the support 52 is changed correspondingly.

Slidably supported on an extension 56 of the pedestal 13 is an oil tube 57 disposed generally parallel to the scale beam. At its outboard end the tube is bent downwardly to provide a terminus 58 within the bucket 54 but is spaced a moderate distance from the bottom of the bucket in both the upper and the lower position of the scale beam 12. The tube end 58 is always out of physical contact with any movable part or attachment of the scale beam 12. The tube 57 is movable longitudinally in its sliding support 56 with the adjusting movement of the bucket 54 and of the support 52. It is always carefully arranged out of contact physically with the surrounding bucket structure.

The tube 57 extends to an expansible chamber or displacement mechanism including a closed cylinder 59 and a piston 61 movable therein in response to the motion of a piston rod 62. Within the cylinder 59 there is disposed a supply of liquid, such as oil, substantially constant in quantity and enough not only to fill the cylinder 59 and the tube 57 but likewise partially to fill the bucket 54 to a level always well above the terminus 58 of the tube 57. The additional weight of about a half bucket of oil is compensated for by a further regulation of the adjusting weight 14 to bring the scale beam 12 and especially the blade 41 into its central or neutral or equilibrium position. Movement of the piston 61 in the cylinder 59 is effective to introduce more oil into the bucket 54 and thereby to make it heavier or upon a return motion, to withdraw oil from the bucket and thereby make it lighter.

In order appropriately to translate the piston 61 by moving the piston rod 62, there is provided a somewhat similar expansible chamber or displacement mechanism 63 including a closed cylinder 64 and a double acting piston 66 mounted on the piston rod 62. From one end of the cylinder 64 a conduit 67 extends to a hydraulic valve 68 and from the other end of the cylinder 64 a similar hydraulic conduit 69 also extends to the valve 68. Supplied to the valve 68 is a quantity of hydraulic fluid under pressure entering through a tube 71 leading from an oil pump 72 driven by an electric motor 73 or other suitable source of power. The pump 72 derives its fluid through an inlet tube 74 extending into an oil reservoir 76. The pressure fluid entering the valve 68 is diverted by the valve either to the tube 67 or to the tube 69 or, as another alternative, is returned through a discharge line 77 to the reservoir 76. While the motor 73 operates, there is normally maintained a continuous circulation of oil from the reservoir 76 through the pump 72, through the valve 78 and back to the reservoir through the return line 77.

The position, operation and effect of the valve 68 are controlled directly in accordance with the response of the diaphragm mechanism 39 to the air jet entering the tube 38. Consequently, whenever the air jet is modulated above or below its median value by movement of the blade 41, a corresponding response of the diaphragm 39 operates the valve 68 correspondingly. Then, instead of being entirely diverted to the return pipe 77, hydraulic fluid is directed into the appropriate one of the tubes 67 or 69. Consequently, the piston 64, being double acting, is translated toward one end or the other of the cylinder 64. Return flow from the cylinder is permitted by the same movement of the valve 68 so that excess or return liquid is sent back to the reservoir 76.

The displacement of the piston 66 is directly in accordance with the position of the blade 41 and produces a correspondingly exact displacement of the piston 61 and a correspondingly exact introduction of oil to or withdrawal of oil from the bucket 54. The weight on the balance beam 12 of the bucket liquid is therefore varied in exact accordance with the position of the blade 41.

For example, if an empty container is placed on the scale platform, it immediately lifts the scale beam 12 until the weights 18 and 19 are approximately positioned. Since, in a series of nominally similar containers the weight variation in successive containers is relatively small, it is possible to position the weights 18 and 19 to represent the average weight of the containers in the entire series. Then, when an individual, empty container is placed on the scale platform, the extension 21 is approximately in a central position but may be above or below such position. If there is a deficiency in the counterbalance for the particular container being weighed, the blade 41 lies above its neutral position. Most or all of the air jet is then received in the tube 38, the diaphragm 39 correspondingly operates the valve 68 and the piston 66 is displaced, to the right in Figure 1, thereby displacing the piston 61 and adding oil from the tube terminus 58 to the bucket 54. This additional weight on the scale beam 12 lowers the extension 21 and correspondingly the blade 41 intercepts more and more of the air jet. The diaphragm 39 is subjected to a lessened pressure, the valve 68 is correspondingly moved, the piston 66 is no longer translated but stops and the piston 61 correspondingly makes no further addition of liquid to the bucket 54 and equilibrium is established.

It sometimes occurs that the blade 41 moves too far or, in effect, "hunts" in response to the first impulse. Even so, if an excessive amount of liquid is first introduced into the bucket 54, then the blade 41 overcompensates and cuts off an excessive amount of the air jet, the pressure on the diaphragm is lowered excessively and correspondingly, the valve 68 is translated so that the piston 61 is retracted and liquid is withdrawn from the bucket 54 to lighten it, thereby permitting the blade 41 again to rise. The structure is such that either it hunts very little or not at all under normal circumstances and the blade 41 comes quickly to a neutral equilibrium position. This is principally due to the damping effect of the hydraulic circuits.

The result of the structure, when an empty container is placed on the scale platform is almost immediately to reset itself at a zero or equilibrium position. Then a set or established additional weight of contents can be placed in the container.

To assist this operation, it is well to have the sliding weight 27 on the hook support 24 exactly proper to counterbalance the weight of contents it is desired to put into the container. During the tare or empty container weighing, the effect of the weight 27 is removed from the scale beam 12. To that end, a lever arm 81 is mounted by a pivot shaft 82 in a housing 83 on the frame work 9 and is actuated by a mechanism 84 preferably an electrical solenoid or a hydraulic cylinder and piston. In the initial operation of the scale, the lever arm 81 is lifted by the mechanism 84 so that the weight 27 is not imposed on the hook support 24 and so is ineffective upon the scale beam 12.

After the empty container has been weighed and the scale beam 12 has automatically come to its neutral position with the empty container in place on the platform, the mechanism 84 is actuated under the manual control of the operator, the arm 81 is lowered and the weight 27 is then also imposed through the hook support 24 upon the balance beam 12. It is then only necessary to fill the container with sufficient material so that the scale beam 12 returns to its central or neutral position. Following the removal of the filled container, reverse actuation of the mechanism 84 lifts the weight 27 again and the scale beam 12 is restored to a condition in which it can sense automatically the weight of the next empty container put on the scale platform.

The provision of this structure by no means interferes with the normal operation of the standard scale. Empty containers, particularly individual ones of a long series of similar containers, when placed on the platform, are automatically weighed and the scale is automatically and accurately compensated for their tare weight within wide limits. Mental calculation by the user is eliminated. The operation of the mechanism is quick. As the air jet has no substantial effect on the scale beam, the accuracy of the operation is not adversely affected. Further, by use of a hydraulic fluid as a counterweight in the bucket 54, there is a viscous damping of the mechanism which reduces adverse hunting. The net result is the provision of a tare weight scale that is quick in operation, that is accurate, that does not adversely affect the standard scale structure to which it is applied and that greatly facilitates tare weighing.

What is claimed is:

1. A tare weight scale comprising a frame, a balance beam on said frame and movable into a position responsive to the weight of an article being weighed, means for establishing an air jet, means on said balance beam for interrupting said jet in an amount corresponding to the position of said balance beam, a container on said balance beam, a displacement means for delivering liquid to and withdrawing liquid from said container, and mechanism responsive to the uninterrupted portion of said jet for controlling said displacement means.

2. A tare weight scale comprising a frame, a balance beam on said frame and movable into a position responsive to the weight of an article being weighed, a container on said balance beam, a displacement means having a movable part for delivering liquid to and withdrawing liquid from said container in quantities proportional to the movement of said movable part, and means responsive to the position of said beam relative to said frame for moving said movable part of said displacement means in amounts proportional to the relative positions of said beam relative to said frame.

3. A tare weight scale comprising a frame, a balance beam on said frame and movable into a position responsive to the weight of an article being weighed, a container on said balance beam, a displacement means for delivering liquid to and withdrawing liquid from said container, and means out of mechanical contact with but responsive to the position of said beam relative to said frame for operating said displacement means.

4. A tare weight scale comprising a frame, a balance beam on said frame and movable into a position responsive to the weight of an article being weighed, a container supported on said balance beam in any of several selected positions, a tube extending into said container and out of contact with the walls thereof in any of said positions, a displacement means for delivering liquid to and withdrawing liquid from said container, and means responsive to the position of said beam relative to said frame for operating said displacement means.

5. A tare weight scale comprising a frame, a balance beam on said frame and movable into a position responsive to the weight of an article being weighed, a container on said balance beam, means for adding liquid to and withdrawing liquid from said container, and means for adding to the quantity of said liquid in said container when said balance beam is in a position relative to said frame corresponding to a heavy article being weighed and for withdrawing from the quantity of said liquid in said container when said balance beam is in another position relative to said frame corresponding to a light article being weighed.

6. A tare weight scale comprising a frame, a balance beam on said frame and movable into a position responsive to the weight of an article being weighed, means for establishing an air jet, means for interrupting said air jet in an amount corresponding to the position of said balance beam, means for varying the quantity of balance weight on said balance beam, and mechanism responsive to the uninterrupted portion of said jet for controlling said varying means.

7. A tare weight scale comprising a frame, a balance beam on said frame and movable into a position responsive to the weight of an article being weighed, means for sensing the position of said balance beam, a container on and movable with said balance beam, a displacement means having a tube stationary on said frame and extending into liquid within said container for delivering liquid to and withdrawing liquid from said container, and means for controlling said displacement means in accordance with the operation of said sensing means.

8. A tare weight scale comprising a frame, a balance beam on said frame and movable into a position responsive to the weight of an article being weighed, means for directing an air jet transversely of said balance beam, means on said balance beam for moving across said air jet to intercept a portion of said air jet, and means responsive to the unintercepted portion of said air jet for varying the weight on said balance beam in an amount corresponding to the magnitude of said unintercepted portion.

HAROLD A. PRICE.
EDGAR HERBERT VICKERY.

References Cited in the file of this patent

UNITED STATES PATENTS

| Number | Name | Date |
| --- | --- | --- |
| 1,079,495 | Jefferies | Nov. 25, 1913 |
| 1,506,477 | Essman | Aug. 26, 1924 |
| 1,732,434 | Dawley | Oct. 22, 1929 |
| 1,878,179 | Rawling | Sept. 20, 1932 |
| 1,980,731 | Michener | Nov. 13, 1934 |
| 2,181,756 | Cook | Nov. 28, 1939 |
| 2,354,431 | Bosomworth | July 25, 1944 |
| 2,394,593 | Christmann | Feb. 12, 1946 |
| 2,489,776 | Hooper | Nov. 29, 1949 |
| 2,527,147 | Noble | Oct. 24, 1950 |